United States Patent
Nammi et al.

(10) Patent No.: US 10,820,340 B2
(45) Date of Patent: Oct. 27, 2020

(54) FACILITATION OF FREQUENCY SELECTIVE SCHEDULING FOR 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Arunabha Ghosh, Austin, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/015,756

(22) Filed: Jun. 22, 2018

(65) Prior Publication Data
US 2019/0394795 A1    Dec. 26, 2019

(51) Int. Cl.
| | |
|---|---|
| *H04W 72/14* | (2009.01) |
| *H04B 17/309* | (2015.01) |
| *H04W 24/10* | (2009.01) |
| *H04W 84/04* | (2009.01) |

(52) U.S. Cl.
CPC .......... *H04W 72/14* (2013.01); *H04B 17/309* (2015.01); *H04W 24/10* (2013.01); *H04W 84/042* (2013.01)

(58) Field of Classification Search
CPC ... H04W 72/14; H04W 24/10; H04W 84/042; H04B 17/309
See application file for complete search history.

(56) References Cited

U.S. PATENT DOCUMENTS

| | | |
|---|---|---|
| 8,155,686 B2 | 4/2012 | Lee et al. |
| 8,532,015 B2 | 9/2013 | Che et al. |
| 8,625,513 B2 | 1/2014 | Seo et al. |
| 8,917,682 B2 | 12/2014 | Yang et al. |
| 9,461,800 B2 | 10/2016 | Vrzic et al. |
| 9,467,268 B2 | 10/2016 | Kwon et al. |
| 9,467,819 B2 | 10/2016 | Niu et al. |
| 9,521,631 B2 | 12/2016 | Athley et al. |
| 9,913,262 B2 | 3/2018 | Takeda et al. |

(Continued)

FOREIGN PATENT DOCUMENTS

| | | |
|---|---|---|
| EP | 3320735 A1 | 5/2018 |
| WO | 2017216613 A1 | 12/2017 |
| WO | 2018058565 A1 | 4/2018 |

OTHER PUBLICATIONS

Sawahashi, Mamoru, et al. "Radio Access Technologies for Broadband Mobile Communications." IEICE Transactions on Communications 100.9 (2017): 1674-1687. https://www.jstage.jst.go.jp/article/transcom/E100.B/9/E100.B_2016PFI0015/_pdf.

(Continued)

*Primary Examiner* — Christine Ng
(74) *Attorney, Agent, or Firm* — Amin, Turocy & Watson, LLP

(57) ABSTRACT

Sub bands can be scheduled with optimal modulation and coding scheme (MCS) when the user equipment reports the sub band channel quality indicator (CQI) and sub band pre-coding matrix index (PMI). The network can use multiple downlink control channels to indicate the sub band resources and the corresponding MCS for that resource allocation. By using multiple downlink control channels to indicate the sub band MCS, the network can use resources more efficiently.

20 Claims, 12 Drawing Sheets

(56) References Cited

U.S. PATENT DOCUMENTS

| | | |
|---|---|---|
| 2005/0281226 A1 | 12/2005 | Lee et al. |
| 2008/0080469 A1 | 4/2008 | Kolding et al. |
| 2012/0082055 A1* | 4/2012 | Seyama ............ H04W 72/0453 370/252 |
| 2013/0107861 A1* | 5/2013 | Cheng ................ H04W 72/042 370/331 |
| 2014/0293957 A1* | 10/2014 | Chun .................... H04L 5/0041 370/330 |
| 2014/0328302 A1* | 11/2014 | Park ..................... H04L 5/0037 370/329 |
| 2015/0341097 A1* | 11/2015 | Yang ................... H04B 7/0617 370/329 |
| 2016/0002166 A1 | 1/2016 | Yerramalli et al. |
| 2016/0021661 A1 | 1/2016 | Yerramalli et al. |
| 2016/0192333 A1* | 6/2016 | Wang ..................... H04W 4/70 370/329 |
| 2017/0026159 A1 | 1/2017 | Kim et al. |
| 2017/0331670 A1 | 11/2017 | Parkvall et al. |
| 2018/0027527 A1 | 1/2018 | Vitthaladevuni et al. |
| 2018/0063799 A1 | 3/2018 | Sadek et al. |
| 2018/0063835 A1 | 3/2018 | Abedini et al. |
| 2018/0124753 A1 | 5/2018 | Sun et al. |
| 2018/0131467 A1 | 5/2018 | Sankar et al. |
| 2018/0310320 A1* | 10/2018 | Gibson ................. H04L 5/0053 |

OTHER PUBLICATIONS

Benjebbour, Anass, et al. "5 G Radio Access Technology." NTT Docomo Technical Journal vol. 17 No. 4 (2016). https://www.nttdocomo.co.jp/english/binary/pdf/corporate/technology/rd/technical_journal/bn/vol17_4/vol17_4_003en.pdf.

International Search Report and Written Opinion received for PCT Application Serial No. PCT/US2019/030713 dated Jul. 29, 2019, 14 pages.

* cited by examiner

FACILITATION OF FREQUENCY SELECTIVE SCHEDULING FOR 5G OR OTHER NEXT GENERATION NETWORK

TECHNICAL FIELD

This disclosure relates generally to facilitating frequency selective scheduling. For example, this disclosure relates to facilitating frequency selective scheduling by scheduling multiple downlink control channels for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a facilitating frequency selective scheduling is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
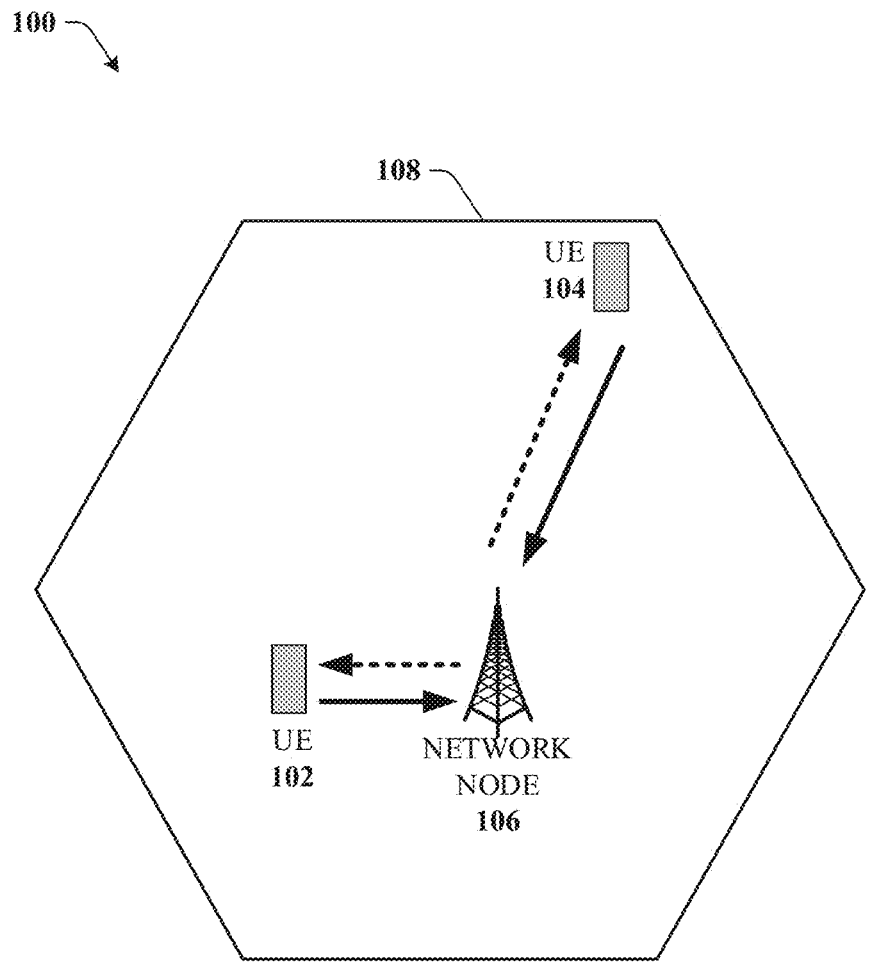
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate frequency selective scheduling for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate frequency selective scheduling for a 5G network. Facilitating frequency selective scheduling for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements (RE) within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A physical downlink control channel (PDCCH) can carry information about scheduling grants. Typically this comprises a of number of multiple-in multiple-out (MIMO) layers scheduled, transport block sizes, modulation for each code word, parameters related to a hybrid automatic repeat request (HARQ), sub band locations etc. It should be noted that all downlink control information (DCI) formats may not transmit all the information as shown above. In general, the contents of PDCCH can depend on a transmission mode and a DCI format. Typically, the following information is transmitted by means of the DCI format: carrier indicator, identifier for dci formats, bandwidth part indicator, frequency domain resource assignment, time domain resource assignment, virtual resource block (VRB) to physical resource block (PRB) mapping flag, PRB bundling size indicator, rate matching indicator, zero-punctuation (ZP) CSI-RS trigger, modulation and coding scheme for each transport block (TB), new data indicator for each TB, redundancy version for each TB, HARQ process number, downlink assignment index, transaction processing benchmark (TPC) command for uplink control channel, physical uplink control channel (PUCCH) resource indicator, physical downlink scheduling channel to HARQ feedback timing indicator, antenna port (s), transmission configuration indication, system requirement specification (SRS) request, codeblock group (CBG) transmission information, CBG flushing out information, and/or demodulation reference signal (DMRS) sequence initialization.

The uplink control channel can carry information about HARQ-acknowledgment (ACK) information corresponding to the downlink data transmission, and channel state information. The channel state information typically comprises: CRI, RI, CQI, PMI and layer indicator data, etc. The CSI can be divided into two categories: one for sub-band and the other for wideband. The configuration of sub-band or wideband CSI reporting can be done through RRC signaling as part of CSI reporting configuration. Table 1 depicts the contents of a CSI report for PMI format indicator=Wideband, CQI format indicator=wideband and for PMI format indicator=sub-band, CQI format indicator=sub-band.

TABLE 1

Contents of CSI report for both wideband and side band

| PMI-Format Indicator = wideband PMI and CQI-Format | PMI-Format Indicator = sub-band PMI or CQI-Format Indicator = sub-band CQI | | |
|---|---|---|---|
| Indicator = wideband | | CSI Part II | |
| CQI | CSI Part I | wideband | sub-band |
| CRI | CRI | Wideband CQI for the second TB | Sub-band differential CQI for the second TB (transport block) of all even sub-bands |
| Rank Indicator | Rank Indicator | PMI wideband (X1 and X2) | PMI sub-band information fields $X_2$ of all even sub-bands |
| Layer Indicator | Layer Indicator | — | Sub-band differential CQI for the second TB of all odd sub-bands |
| PMI wideband | Wideband CQI | — | PMI sub- |

TABLE 1-continued

Contents of CSI report for both wideband and side band

| PMI-Format Indicator = wideband PMI and CQI-Format Indicator = wideband | PMI-Format Indicator = sub-band PMI or CQI-Format Indicator = sub-band CQI | | |
|---|---|---|---|
| | CSI Part II | | |
| CQI | CSI Part I | wideband | sub-band |
| (X1 and X2) | | | band information fields $X_2$ of all odd sub-bands |
| Wideband CQI | Sub-band differential CQI for the first TB | — | — |

Note that for NR, the sub-band is defined according to the bandwidth part of the OFDM in terms of PRBs as shown in Table 2. The sub-band configuration is also done through RRC signaling.

TABLE 2

Configurable sub-band sizes

| Carrier bandwidth part (PRBs) | Sub-band Size (PRBs) |
|---|---|
| <24 | N/A |
| 24-72 | 4, 8 |
| 73-144 | 8, 16 |
| 145-275 | 16, 32 |

As mentioned in the above sections, when the UE is configured to report sub band PMI and sub band CQI, the UE can send feedback either on wideband CQI and wideband precoding matrix index (PMI), or sub band CQI and sub band precoding matrix index based on the RRC configuration of CSI reporting. However, the current 5G specifications do not support sub band based scheduling, as the downlink control channel indicates only one MCS field. Thus, even though the UE can report the sub band CQI (i.e. SINR), the network can't use this information, as the network needs to average the SINR over all the sub bands to determine the resultant SINR i.e. the MCS. This results in reduction in throughput and the use of sub band reporting becomes a useless feature for 5G systems.

This disclosure proposes methods to schedule sub bands with an optimal modulation and coding scheme (MCS) when the UE reports the sub band CQI and sub band PMI. The network can use multiple downlink control channels to indicate the sub band resources and the corresponding MCS for that resource allocation. By using multiple downlink control channels to indicate the sub band MCS, the network can use resources more efficiently. For example, the network can determine the criteria for scheduling multiple downlink control channels to schedule sub band MCS, and the UE can decode multiple downlink control channels to decode the data channels. The aforementioned processes can provide gains in sector throughput and cell edge user throughput, and the a legacy feedback channel can be used, thus reducing the standardization effort for designing a new control channel for indicating sub band MCS.

Although embodiments herein are described for downlink data transmission for MIMO systems, the same principle can be applicable for uplink and side link systems. Rather than using a single scheduling grant/downlink control channel for scheduling all the sub bands, the network can use multiple scheduling grants/downlink control channels where each downlink control structure can indicate scheduling of one or more sub bands, thereby providing gains. This is because each downlink control channel can indicate its own MCS thereby providing network flexibility. In another embodiment, the network can use the UE speed as the metric to determine whether it needs to schedule one physical downlink control channel (PDCCH) or more than one PDCCH. At slow speeds, the frequency selective gains are large, as opposed to with high speeds the network can use only one PDCCH with wideband CQI/MCS. Once the gNode B (gNB) determines the number of multiple control channels, where each control channel can schedule either one or more sub bands, each PDCCH can indicate the corresponding MCS for a set of sub band(s). The HARQ process number field in the PDCCH field can be the same or different. In another embodiment the HARQ process number of each PDSCH is same.

Generally only one MCS is indicated for each transfer block. When the UE reports the CQI based on wide band or sub band CQI. The UE can report multiple sub band CQI because some sub bands have better channel quality than other sub bands. The UE can also send the average channel quality of all of the sub bands. Some sub bands can have better channel quality than other sub bands. If gNB wants to schedule four sub bands, then one option is to use the wide band CQI for the four sub bands. However, some sub band channel quality can be low and other sub band channel quality can be high. Thus the gNB can average the channel quality because of the limitation of a single pipe. In the case where two sub band SINRs are good and two sub band SINRs are bad, the sub bands with good SINR can be scheduled together and the sub bands with bad SINR can be scheduled together. Thus, in this disclosure, multiple downlink control channels and multiple data traffic channels can be transmitted to schedule like channel quality sub bands together.

In one embodiment, described herein is a method comprising facilitating, by a wireless network device of a wireless network and that comprises a processor, sending a reference signal to a mobile device of the wireless network. The method can comprise facilitating, by the wireless network device, receiving channel state data associated with a feedback channel from the mobile device in response to the sending the reference signal. Additionally, based on the channel state data, the method can comprise determining, by the wireless network device, a number of scheduling grants to be used to schedule sub band communications by the wireless network device.

According to another embodiment, a system can facilitate, receiving a reference signal from a base station device of a wireless network. Based on the reference signal, the system can send channel state data, via a feedback channel, to the base station device. Additionally, in response to the sending the channel state data the system can receive downlink control channels, from the base station device, to be utilized for sub band communication. Furthermore, the system can comprise receiving channel data in accordance with a number of scheduling grants generated by the base station device; and in response to the receiving the downlink control channels, the system can decode the downlink control channels to determine a sub band resource allocation.

According to yet another embodiment, described herein is a machine-readable storage medium that can perform the operations comprising facilitating sending a reference signal to a mobile device of a wireless network. In response to the facilitating the sending the reference signal, the machine-readable storage medium can perform operations comprising facilitating receiving channel state data, associated with a feedback channel. In response to the receiving the channel state data, the machine-readable storage medium can perform operations comprising determining a first physical downlink control channel and a second physical downlink control channel to be used to schedule sub bands. Additionally, the machine-readable storage medium can perform operations comprising scheduling the sub bands in accordance with a group of channels comprising the first physical downlink control channel and the second physical downlink control channel based on a channel quality of the sub bands.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 106 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
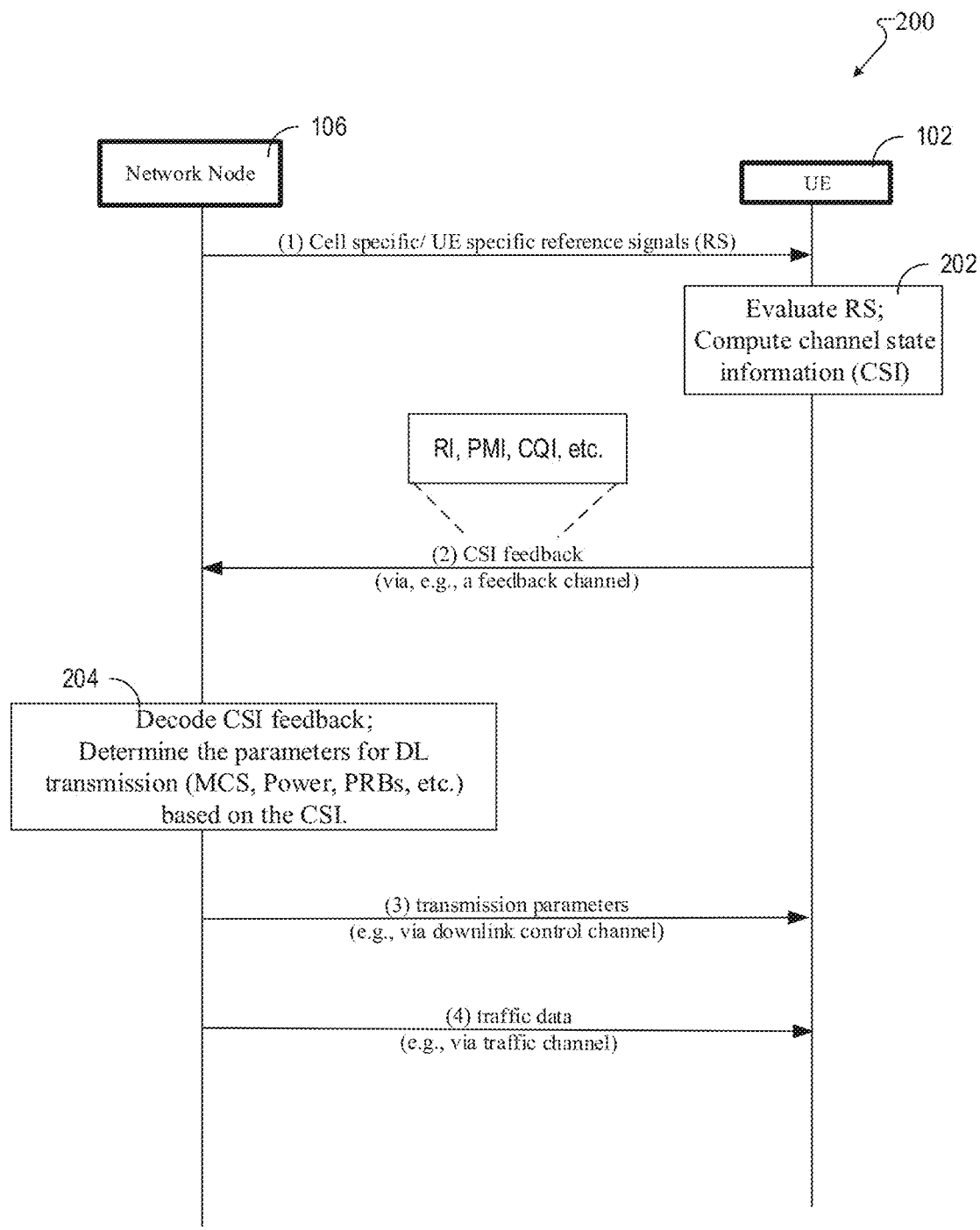
FIG. 2 illustrates an example schematic system block diagram of a message sequence chart between a network node and user equipment according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
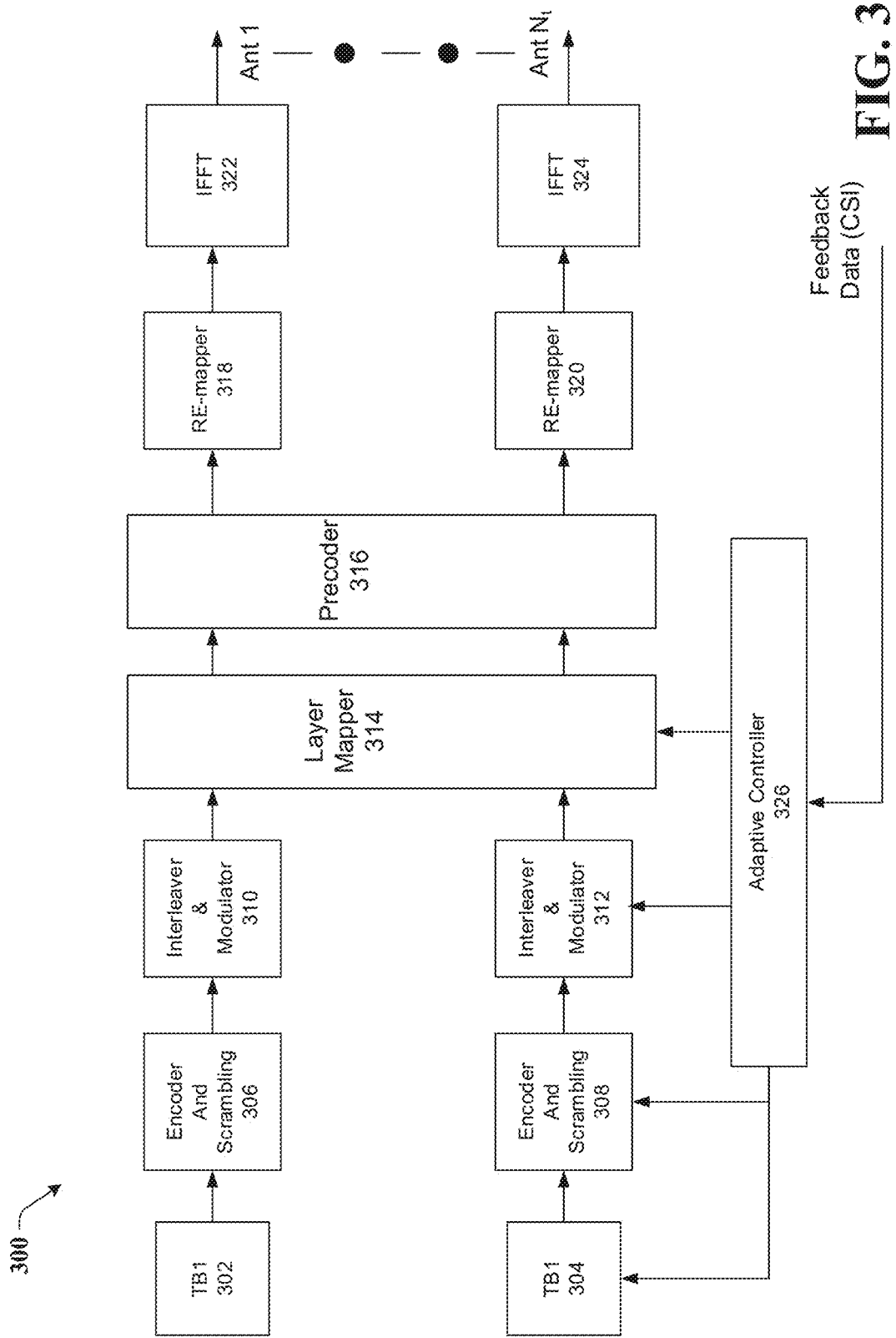
FIG. 3 illustrates an example schematic system block diagram of a coding chain for a physical downlink shared channel transmitter according to one or more embodiments.

Referring now to FIG. 3, illustrated is an example schematic system block diagram of a coding chain for a physical downlink shared channel transmitter according to one or more embodiments. FIG. 3 depicts the transmission side of a MIMO communication system 300 with $N_t$ transmit antennas. There are up to 2 transport blocks 302, 304 where the number of transport blocks can be equal to one when the number of layers is less than or equal to 4. If the number of layers is more than 4, then 2 transport blocks can be transmitted. The cyclic redundancy check (CRC) bits can be added to each transport block and passed to the channel encoder 306, 308. Low-density parity check codes (LDPC) can be used for forward error correction (FEC) in NR. The channel encoder 306, 308 can add parity bits to protect the data. After encoding, the data stream can be scrambled with user-specific scrambling. Then the stream can be passed through an interleaver 310, 312.

The interleaver size can be adaptively controlled by puncturing to increase the data rate. The adaptation can be performed by using the information from the feedback channel (e.g., channel state information sent by the receiver). The interleaved data can be passed through a symbol mapper (modulator). The symbol mapper can also be controlled by the adaptive controller 326, after the modulator streams are passed through a layer mapper 314 and the precoder 316. The resultant symbols can be mapped at resource element (RE) mappers 318, 320 to the resource elements in a time-frequency grid of OFDM. The resultant streams can then be passed through an inverse fast fourier transform (IFFT) block 322, 324. It should be noted that in some systems, the IFFT block may not be necessary and can be dependent on the multiple access system. The encoded stream can then be transmitted through the respective antenna.

Figure 4:
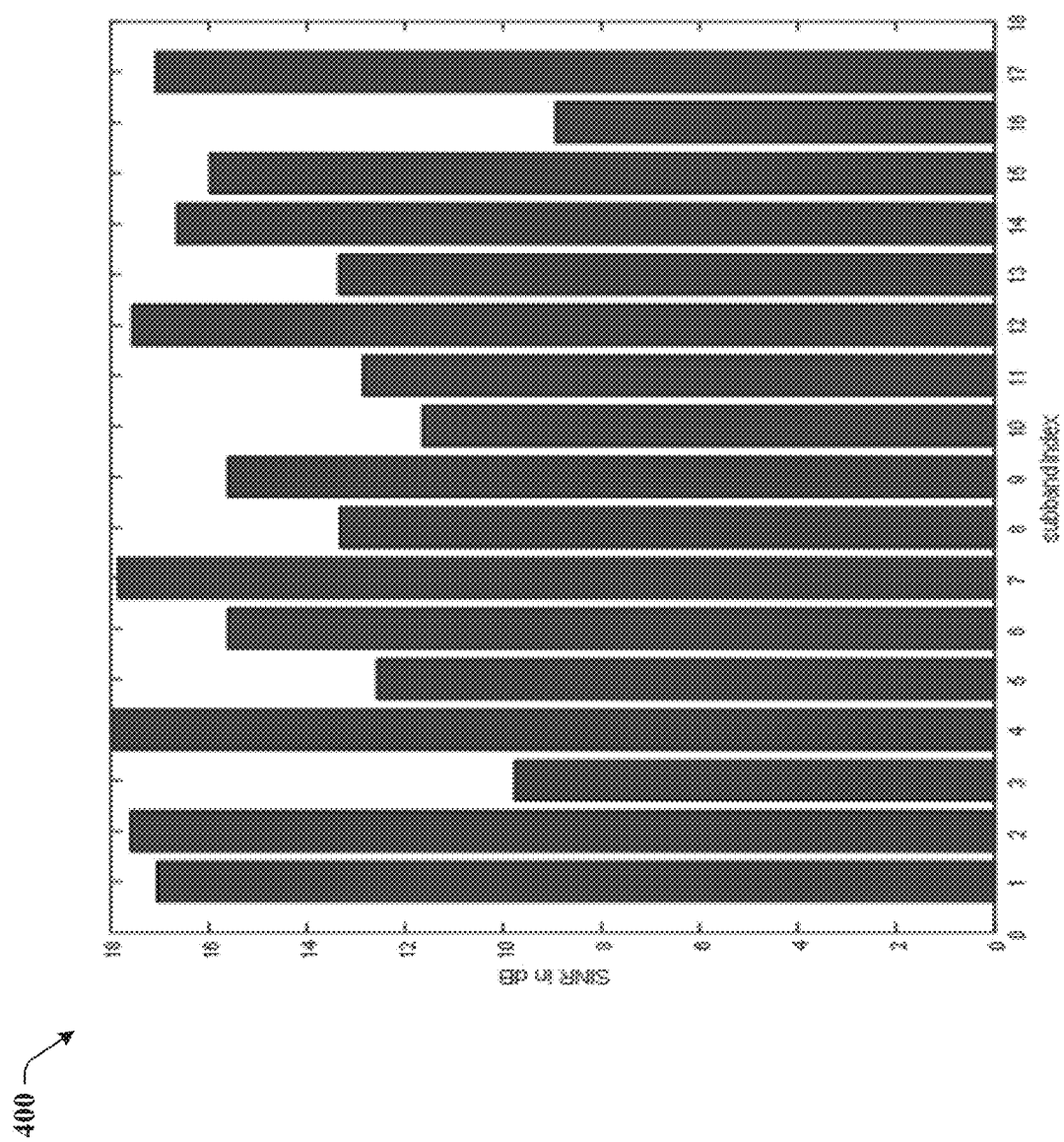
FIG. 4 illustrates an example schematic system block diagram of a coding chain for a physical downlink shared channel transmitter according to one or more embodiments.

Referring now to FIG. 4, illustrated is an example schematic system block diagram of a coding chain for a physical downlink shared channel transmitter according to one or more embodiments. FIG. 4 depicts the sub-band CQI reported by the UE 102 for a 4×4 NR MIMO system with 272 resource blocks (RBs), where each RB is of 12 sub-carriers each having a bandwidth of 180 KHz. Since the bandwidth is very large, the variation in the reported signal interference to noise ratio (SINR) is increased. If the network schedules data in the first 3 sub bands for the UE 102, then a method to choose the MCS can be to conserve the SINR. Hence, in this case, with an SINR of 9 dB, the corresponding MCS can be indicated in the DCI. In this technique, even though the TB can pass, the network cannot schedule with a higher MCS even though some sub bands can have a high SINR. Another technique is to use the average of the SINR. Then, according to the reported CQI (SINR), the network can use the average of the SINR (17+17+9)/3=14 dB. In this case, the MCS can be less than the sub band SINR, which can reduce the achievable throughput for the sub band.

Figure 5:
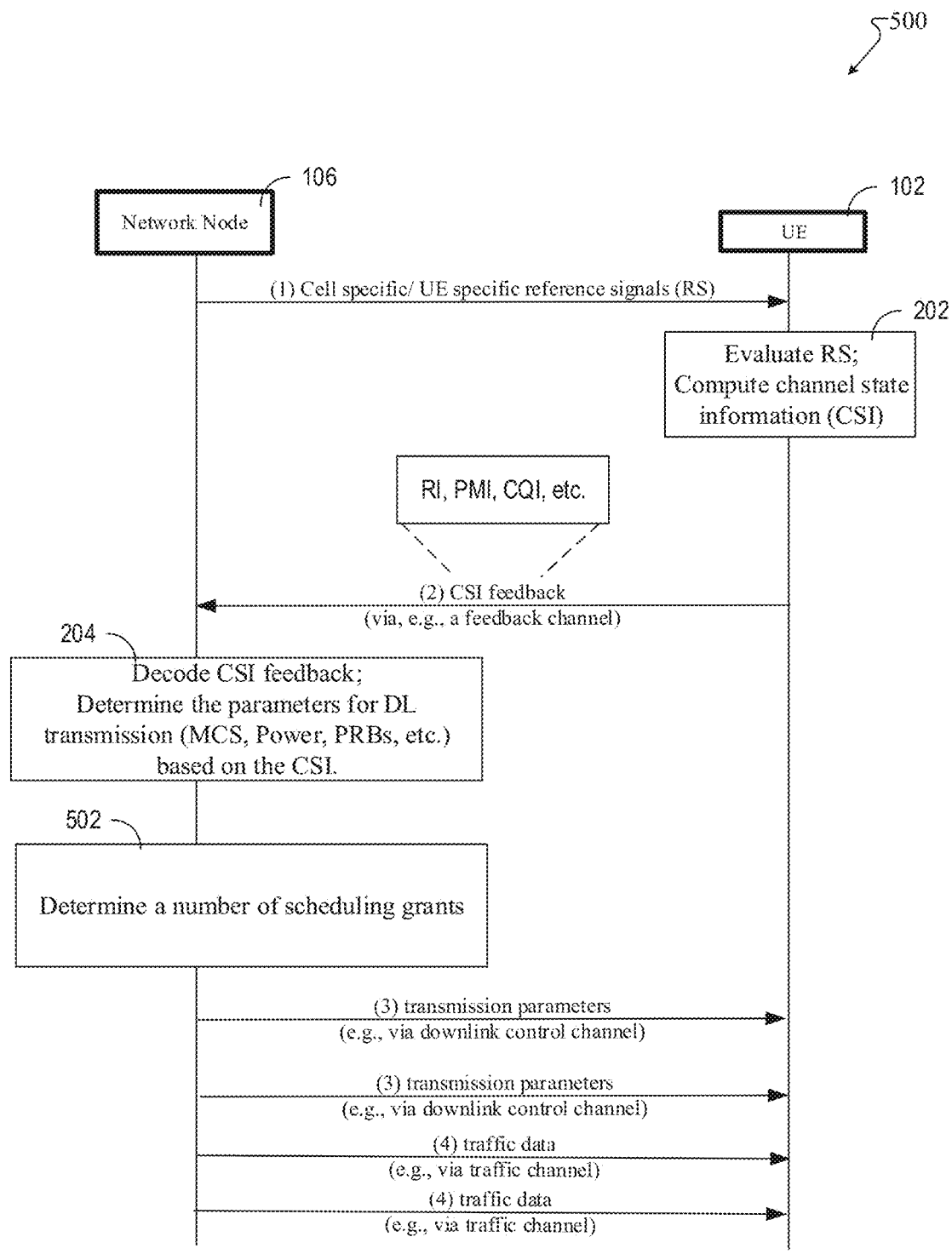
FIG. 5 illustrates a message sequence chart with multiple scheduling grants according to one or more embodiments.

Referring now to FIG. 5 illustrates a message sequence chart 500 with multiple scheduling grants according to one or more embodiments. Repetitive description of like elements is omitted for the sake of brevity. For example, in one downlink control channel, all of the sub band channels that have quality above a defined level and/or have a similar channel quality, can be scheduled together, and all of the sub band channels that have quality below a defined level and/or similar channel quality can be scheduled together. Therefore, based on the CSI feedback received by the network node 106, the network node 106 can determine a number of scheduling grants (e.g., multiple downlink control channels) 502. For example, if the $P_{SINR}$ is the maximum of the sub band SINR (or CQI) and $M_{SINR}$ is the mean of the sub band SINR (or CQI), then the delta SINR can be defined as the difference between the peak SINR and mean SINR as:

$$\Delta SINR = PSINR - MSINR \qquad \text{Equation (1):}$$

Then the network node 106 can schedule more than one PDSCH (and/or PDCCH) if $\Delta SINR > \Delta th$, where $\Delta th$ is a pre-defined threshold (e.g., if the difference between the SINRs is very large, use a separate PDSCH for the sub band which has highest SINR). Thus, one downlink control channel can be used for the best sub bands and another downlink control channel can transmit all the medium channel quality sub bands and/or sub bands with reduced channel quality. Therefore, the UE 102 can receive multiple (e.g., 2 or more) downlink control channels (3). The UE 102 can then decode the downlink control channels and the data traffic channels. The UE 102 can then send two acknowledgments via 2 feedback channels, and the data traffic channels (4) can perform the same as the downlink control channels (3) but with regards to resource element mapping. It should be noted that although only two scheduling grants and 2 data traffic channels are depicted in FIG. 5, the same concept can be extended to multiple scheduling grants and multiple data traffic channels.

In one or more embodiments, the network can use the SINR as the metric to decide about the second PDCCH grant. In one or more embodiments, the network can use CQI as the metric to decide the second PDCCH grant. In one or more embodiments the network can choose a sub set of sub bands (based on the scheduling decision) and compute the peak SINR (or CQI) and mean SINR (or CQI). In one or more embodiments, the network can use the UE speed as the metric to determine whether it needs to schedule one PDCCH or more than one PDCCH because at slow speeds the frequency selective gains are large while and at high speeds the network can use only one PDCCH with wideband CQI/MCS. Once the network node 106 determines the number of multiple control channels, where each control channel can schedule either one or more sub bands, and each PDCCH can indicate the corresponding MCS for a set of sub band(s).

Figure 6:
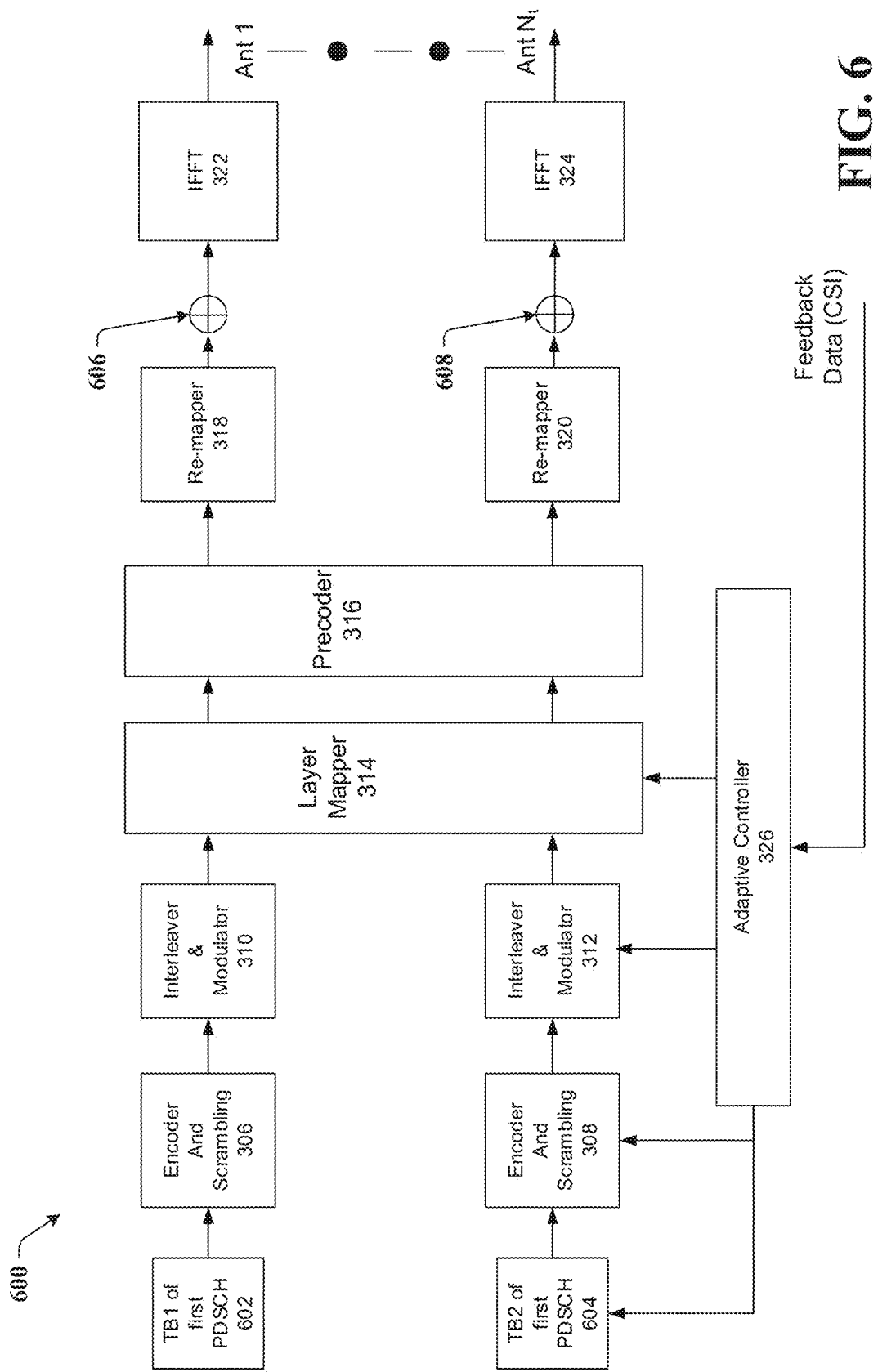
FIG. 6 illustrates a coding chain of a proposed structure comprising two physical downlink shared channels according to one or more embodiments.
Figure 7:
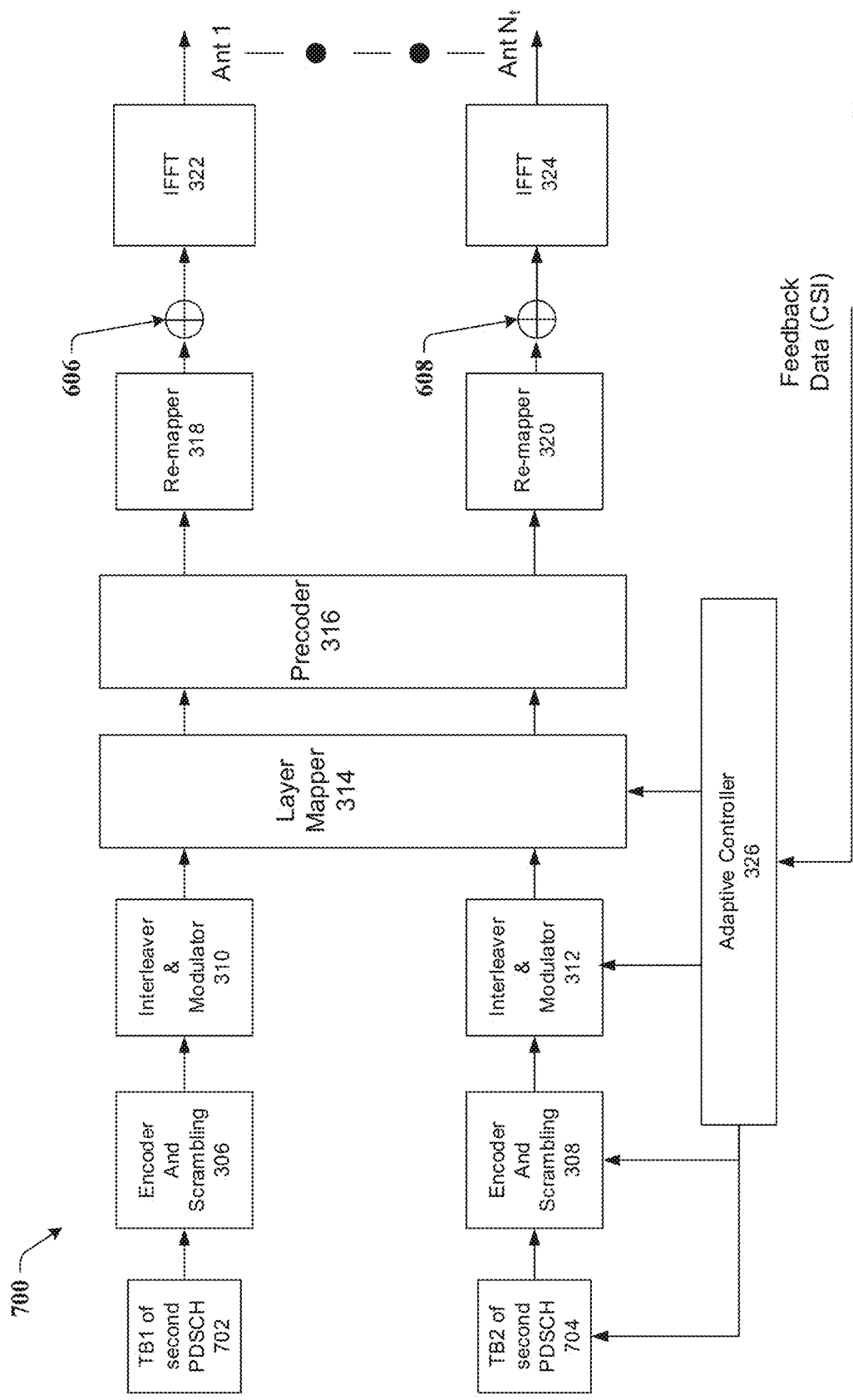
FIG. 7 illustrates an output of the second physical downlink shared channel according to one or more embodiments.

Now referring now to FIG. 6 and FIG. 7, illustrated is a coding chain of a proposed structure comprising two physical downlink shared channels 600 and an output 700 of the second physical downlink shared channel according to one or more embodiments according to one or more embodiments. Repetitive description of like elements is omitted for the sake of brevity.

In FIG. 6, the first physical downlink shared control channel 602 can have 1 resource element mapping 318 and the second physical downlink shared control 604 can have a second resource element mapping 320. Thus, certain resource elements can have different MCSs than others as opposed to conventionally where all resource elements can use the same MCSs. When there is a large variation in the CQI, then the system can schedule multiple downlink control channels to compensate for the varied channel quality. The network node 106 can also inform the UE 102 that the network node 106 is utilizing more than one control channel. Thus, FIG. 6 depicts the coding chain of the proposed structure with two PDSCHs 602, 604, where the first PDSCH 602 uses the same structure as that of conventional PDSCH. However, at the output of the resource element mapper 320 a second output 608 from the second PDSCH is added. The resultant signal can be passed through the IFFT as that of the conventional coding chain. FIG. 7 depicts the output 700 of the second physical downlink shared channel 702, 704. Once the UE 102 receives multiple downlink control channels and multiple data traffic channels, the UE 102 can decode the data traffic channels individually to decode each transport block to determine whether each transport block shall pass or not.

Figure 8:
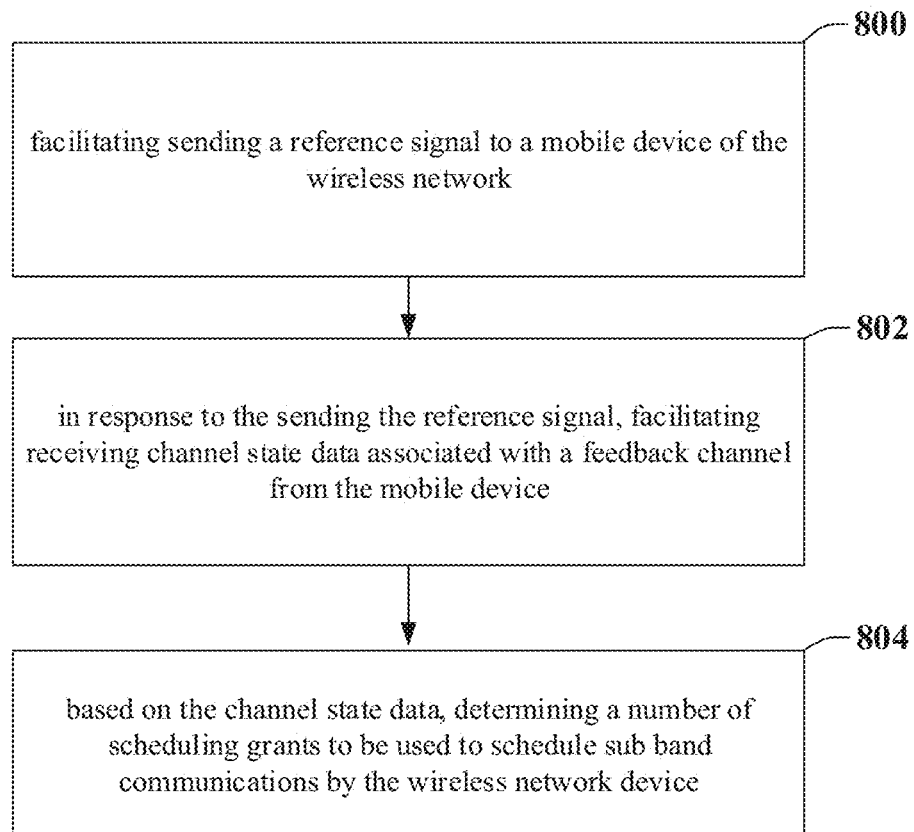
FIG. 8 illustrates an example flow diagram for a method for facilitating frequency selective scheduling for a 5G network according to one or more embodiments.

Referring now to FIG. 8, illustrated an example flow diagram for a method for facilitating frequency selective scheduling for a 5G network according to one or more embodiments. At element 800, a method can facilitate sending a reference signal (e.g., via the network node 106) to a mobile device (e.g., UE 102) of the wireless network. The method can comprise facilitating receiving (e.g., by the network node 106) channel state data associated with a feedback channel from the mobile device (e.g., UE 102) in response to the sending the reference signal at element 802. Additionally, at element 804, based on the channel state data, the method can comprise determining (e.g., via the network node 106) a number of scheduling grants to be used to schedule sub band communications by the wireless network device (e.g., via the network node 106).

Figure 9:
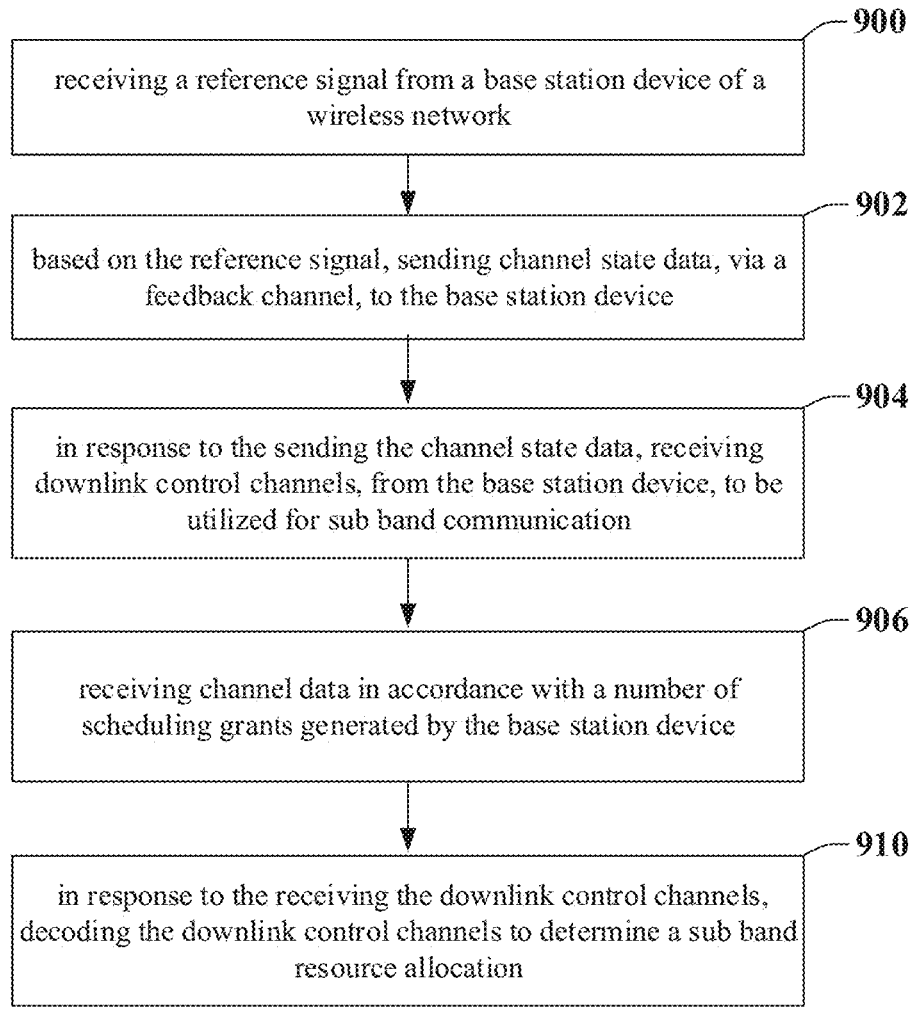
FIG. 9 illustrates an example flow diagram for a system for facilitating frequency selective scheduling for a 5G network according to one or more embodiments.

Referring now to FIG. 9, illustrates an example flow diagram for a system for facilitating frequency selective scheduling for a 5G network according to one or more embodiments. At element 900, a system can facilitate, receiving (e.g., by UE 102) a reference signal from a base station device (e.g., the network node 106) of a wireless network. Based on the reference signal, at element 902, the system can send (e.g., via the UE 102) channel state data, via a feedback channel, to the base station device (e.g., the network node 106). Additionally, in response to the sending the channel state data the system can receive (e.g., by UE 102) downlink control channels, from the base station device (e.g., the network node 106), to be utilized for sub band communication at element 904. Furthermore, the system can comprise receiving channel data (e.g., by UE 102) in accordance with a number of scheduling grants generated by the base station device (e.g., the network node 106) at element 906; and in response to the receiving the downlink control channels, the system can decode (e.g., by UE 102) the downlink control channels to determine a sub band resource allocation at element 908.

Figure 10:
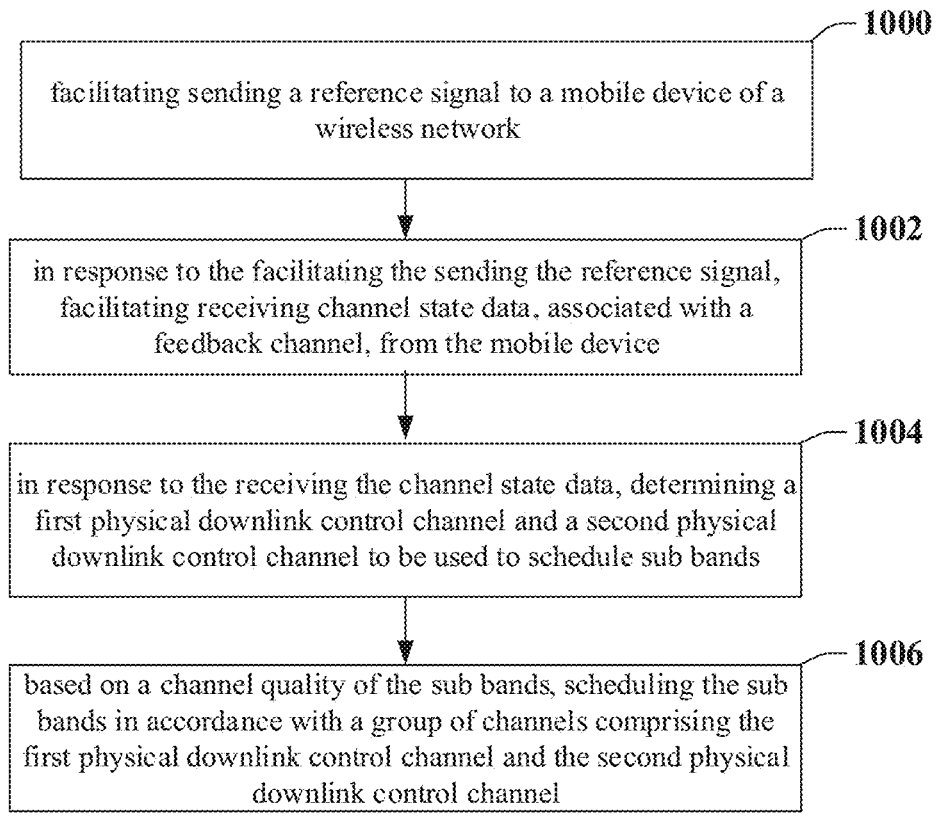
FIG. 10 illustrates an example flow diagram for a machine-readable medium for facilitating frequency selective scheduling for a 5G network according to one or more embodiments.

Referring now to FIG. 10, illustrated is an example flow diagram for a machine-readable medium for facilitating frequency selective scheduling for a 5G network according to one or more embodiments. At element 1000, a machine-readable storage medium can facilitate sending a reference signal to a mobile device (e.g., UE 102) of a wireless network. In response to the facilitating the sending (e.g., via the network node 106) the reference signal, the machine-readable storage medium can perform operations comprising facilitating receiving channel state data (e.g., from the UE 102), associated with a feedback channel at element 1002. In response to the receiving the channel state data, the machine-readable storage medium can perform operations comprising determining a first physical downlink control channel and a second physical downlink control channel to be used to schedule sub bands at element 1004. Additionally, at element 1006 the machine-readable storage medium can perform operations comprising scheduling (e.g., via the network node 106) the sub bands in accordance with a group of channels comprising the first physical downlink control channel and the second physical downlink control channel based on a channel quality of the sub bands.

Figure 11:
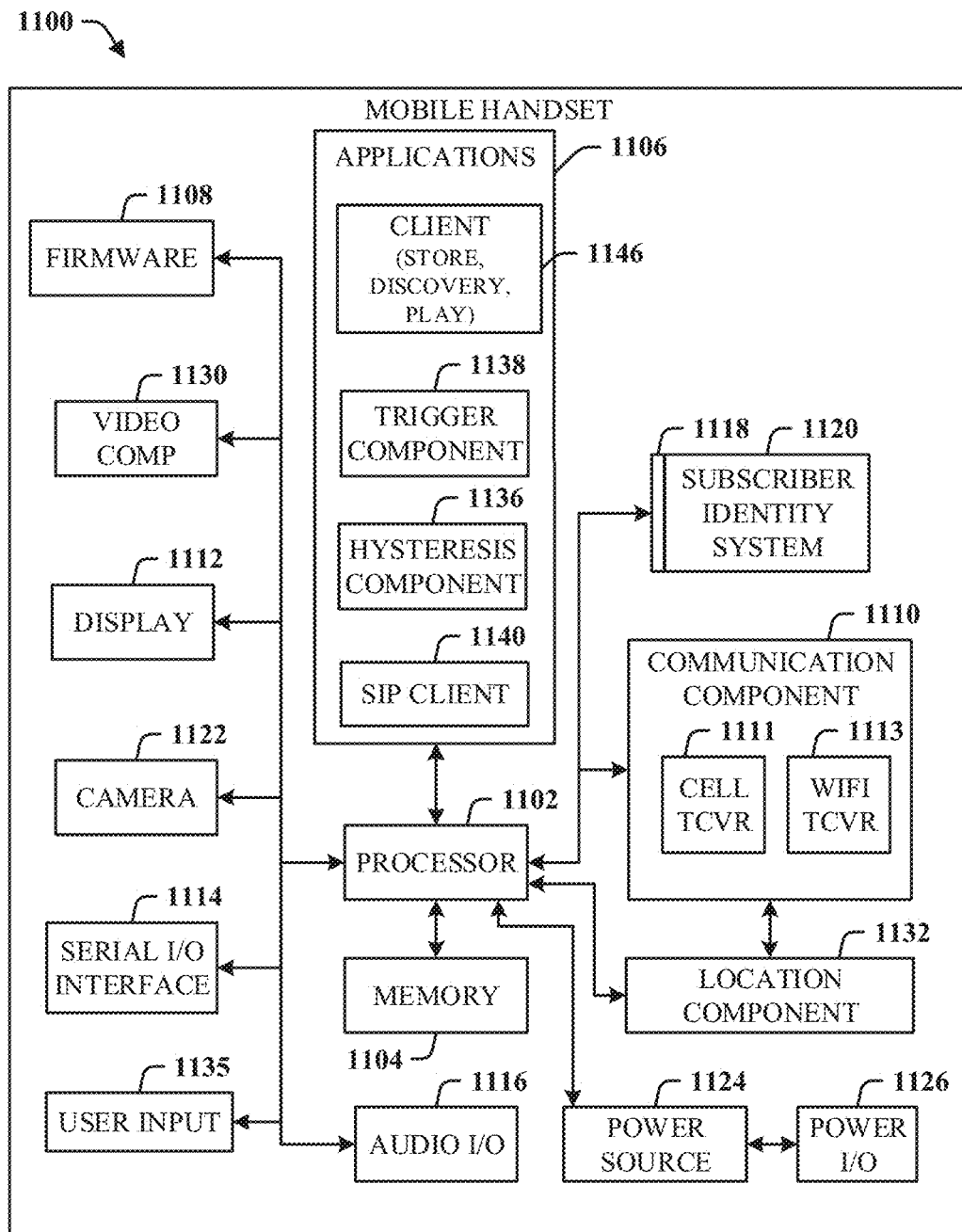
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
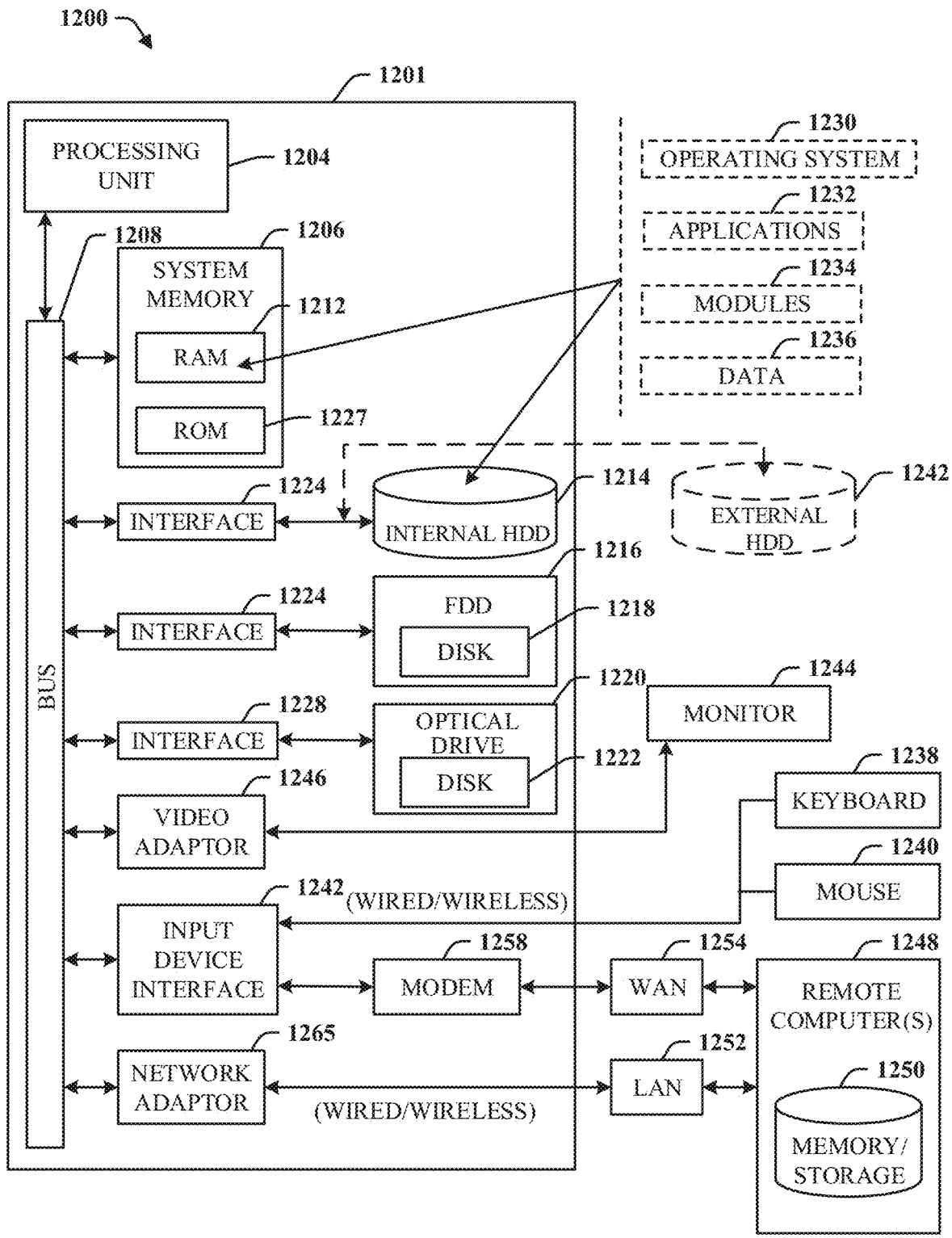
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    facilitating, by network equipment comprising a processor, sending a reference signal to a user equipment;
    in response to the sending, facilitating, by the network equipment:
        receiving channel state data associated with a feedback channel from the user equipment, wherein the channel state data comprises an average channel quality value representative of a first average channel quality of first sub band communications, and
        receiving speed data, representative of a speed of the user equipment, from the user equipment;
    based on the channel state data, obtaining, by the network equipment, a result of an averaging of the channel quality data, the result comprising data representative of a second average channel quality of the first sub band communications; and
    based on the second average channel quality and the speed data, determining, by the network equipment, a number of scheduling grants to be used to schedule second sub band communications by the network equipment.

2. The method of claim 1, further comprising:
    scheduling, by the network equipment, the second sub band communications in accordance with the scheduling grants.

3. The method of claim 2, wherein the scheduling comprises scheduling a first downlink control channel for a first sub band and scheduling a second downlink control channel for a second sub band different than the first sub band based on a channel quality associated with the first sub band communications.

4. The method of claim 3, wherein the first sub band comprises a first channel quality and the second sub band comprises a second channel quality, and wherein the first channel quality is greater than the second channel quality.

5. The method of claim 4, further comprising:
    facilitating, by the network equipment, sending data via a data traffic channel using an indicated sub band.

6. The method of claim 1, wherein the channel state data comprises a sub band channel quality indicator.

7. The method of claim 1, wherein the channel state data comprises a sub band pre-coding matrix index.

8. A system, comprising:
    a processor; and
    a memory that stores executable instructions that, when executed by the processor, facilitate performance of operations, comprising:
        receiving a reference signal from a base station;
        based on the reference signal, sending, via a feedback channel, channel state data to the base station, wherein the channel state data comprises a first average channel quality value associated with a first average channel quality of a sub band communication;
        based on the channel state data, generating a second average channel quality value associated with a second average channel quality of the sub band communication;
        in response to the sending, receiving, from the base station, downlink control channels to be utilized for the sub band communication;
        receiving speed data indicative of a speed of a user equipment;
        receiving channel data in accordance with a number of scheduling grants generated by the base station; and
        in response to receiving the downlink control channels, the second average channel quality, and the speed data, decoding the downlink control channels to determine a sub band resource allocation associated with the sub band communication.

9. The system of claim 8, wherein the sub band resource allocation results in an allocation of a data channel capable of facilitating data transfer.

10. The system of claim 8, wherein the downlink control channels indicate a schedule associated with a sub band.

11. The system of claim 8, wherein the downlink control channels indicate a modulation and coding scheme associated with a sub band.

12. The system of claim 8, wherein the downlink control channels comprise a first downlink control channel and a second downlink control channel used to determine the sub band resource allocation.

13. The system of claim 12, wherein the second downlink control channel is based on a signal interference-to-noise ratio associated with the user equipment.

14. The system of claim 12, wherein the second downlink control channel is based on a channel quality indicator associated with the user equipment.

15. A non-transitory machine-readable medium, comprising executable instructions that, when executed by a processor, facilitate performance of operations, comprising:
   facilitating sending a reference signal to a mobile device via a network;
   in response to the sending, facilitating receiving channel state data, associated with a feedback channel, from the mobile device, wherein the channel state data comprises a first average channel quality value representative of a first average channel quality of first sub bands;
   in response to receiving the channel state data:
      averaging a second average channel quality of the first sub bands resulting in a second average channel quality value, and
      determining a first physical downlink control channel and a second physical downlink control channel to be used to schedule second sub bands different than the first sub bands;
   facilitating receiving speed data associated with a speed of the mobile device; and
   based on the second average channel quality of the first sub bands and the speed data, scheduling the second sub bands in accordance with a group of channels comprising the first physical downlink control channel and the second physical downlink control channel.

16. The non-transitory machine-readable medium of claim 15, wherein determining the first physical downlink control channel comprises determining that a threshold value, of a signal interference-to-noise ratio associated with the mobile device, has been attained.

17. The non-transitory machine-readable medium of claim 15, wherein determining the second physical downlink control channel is based on a signal interference-to-noise ratio associated with the mobile device.

18. The non-transitory machine-readable medium of claim 15, wherein determining the second physical downlink control channel comprises determining that a function of a threshold value, of a signal interference-to-noise ratio associated with the mobile device, has been satisfied.

19. The non-transitory machine-readable medium of claim 15, wherein determining the second physical downlink control channel is based on a channel quality indicator associated with a channel to be used by the mobile device.

20. The non-transitory machine-readable medium of claim 15, wherein determining the second physical downlink control channel comprises determining that a function of a threshold value, of a channel quality indicator associated with a channel to be used by the mobile device, has been satisfied.

* * * * *